Feb. 10, 1959

R. N. BROWN 2,872,814

FLUID FLOW MEASURING GAUGE

Filed April 1, 1957

Inventor
Royce N. Brown
by Joseph E. Kerwin
Attorney

Feb. 10, 1959  R. N. BROWN  2,872,814
FLUID FLOW MEASURING GAUGE
Filed April 1, 1957  2 Sheets-Sheet 2
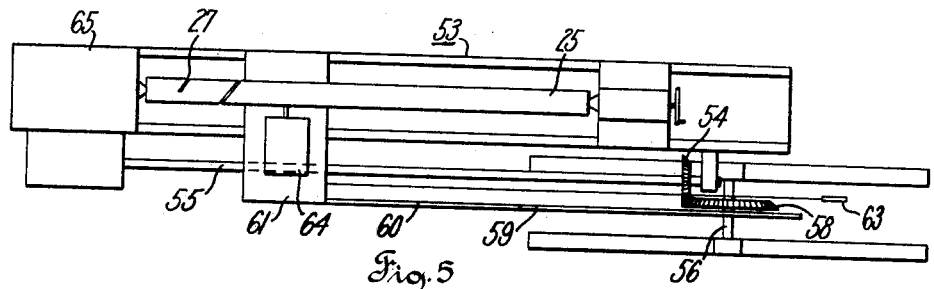
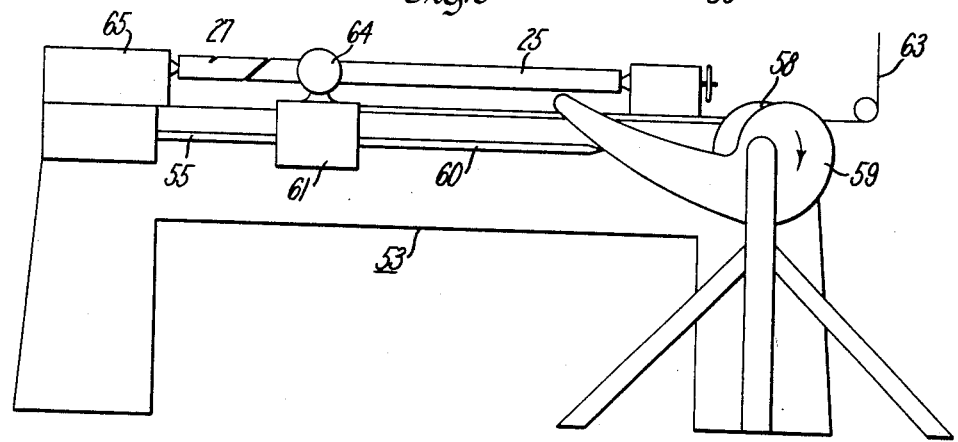
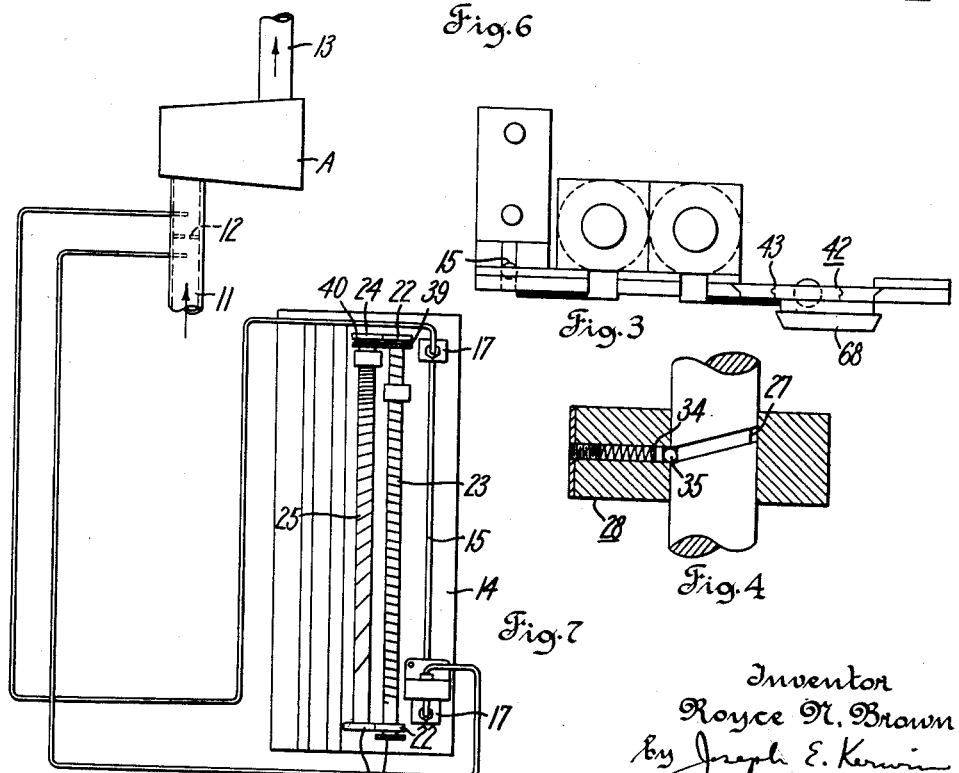
Inventor
Royce N. Brown
By Joseph E. Kerwin
Attorney

United States Patent Office 2,872,814
Patented Feb. 10, 1959

2,872,814

FLUID FLOW MEASURING GAUGE

Royce N. Brown, Milwaukee, Wis., assignor to Allis-Chalmers Manufacturing Company, Milwaukee, Wis.

Application April 1, 1957, Serial No. 649,753

6 Claims. (Cl. 73—401)

This invention relates to a flow measuring gauge for compressible fluids, the gauge operating in conjunction with a metering device such as an orifice or similar pressure differential device, in which the pressure drop across the orifice is indicated by the height of a liquid column in a manometer tube, with means provided to insert corrections for barometric pressure and ambient temperature changes so that readings of the fluid flow rate may be taken directly in the form of standard flow units.

The flow measuring gauge has been provided with several scales calibrated in logarithmic functions; and so arranged that the relative positioning of the respective scales and their indices under existing operating conditions provides the measure of flow in standard units. Sliding scales are provided permitting corrections for temperature and pressure changes. The scale arrangement permits reading directly in standard cubic feet per minute without the need for slide rule or longhand corrections. Once the sliding scales are set to the existing temperature and pressure they can be moved as a unit to the proper location, and relation to the other scales, which in turn eliminates operations that would ordinarily have to be repeated on a slide rule. The gauge also permits the average layman to calculate the flow rate, and in setting the temperature and pressure on the sliding scales, he is unknowingly performing an operation analogous to the slide rule, without being familiar with slide rule techniques.

The invention is especially suitable for use on compressors or the like where it is necessary for efficient operation to know the amount of flow under existing atmospheric conditions. An application of the gauge may be illustrated when used with a compressor that supplies the necessary oxygen to a blast furnace. When the compressor is set for delivering a certain weight of oxygen per minute to the furnace, it is important for combustion purposes that a constant weight of oxygen be maintained. However, it is not unusual to find that the actual weight delivered has varied considerably from that which would be delivered under "standard" conditions of air, and it becomes necessary to increase or diminish the volumetric intake of the machine in order that the proper weight of oxygen may be delivered. For a given volume of air, the weight of oxygen varies according to the barometric conditions, and accordingly the intake of the machine must be regulated in accordance with the changes in barometric conditions.

An object of the present invention is to provide an improved fluid flow measuring gauge which will directly measure the flow of compressible fluids in standard flow units through the relative positioning of logarithmic scales used to solve the formula $$Q = K'\sqrt{\frac{h_w P_1}{T_1}}$$

and permitting corrections for temperatures and pressures.

Another object is to provide an improved fluid flow measuring gauge of rugged mechanical construction that may be operated by the average layman to determine standard rate of fluid flow while permitting corrections for temperature and pressures without being familiar with slide rule methods or techniques.

Still another object is to provide a fluid flow measuring gauge that will determine the proper pressure differential required for a known flow rate under known atmospheric conditions.

The foregoing and other objects and advantages will be apparent from the description herein set forth in the following specification detailing the important features of the invention and broadly claiming the same, in conjunction with the accompanying drawings, in which:

Fig. 8 is a side elevational view of the gauge shown in Fig. 1;

Fig. 3 is a top view of the gauge taken along line III—III in Fig. 1;

Fig. 4 is a cross sectional view of the follower taken along line IV—IV in Fig. 1;

Fig. 5 is a top view of the machine lathe arrangement for cutting the square grooved threads in the logarithmic lead screw;

Fig. 6 is a side view of the machine lathe arrangement as shown in Fig. 5; and

Fig. 7 is a schematic sketch of the gauge, shown remotely connected in a control center to the intake of a compressor.

Figure 1:
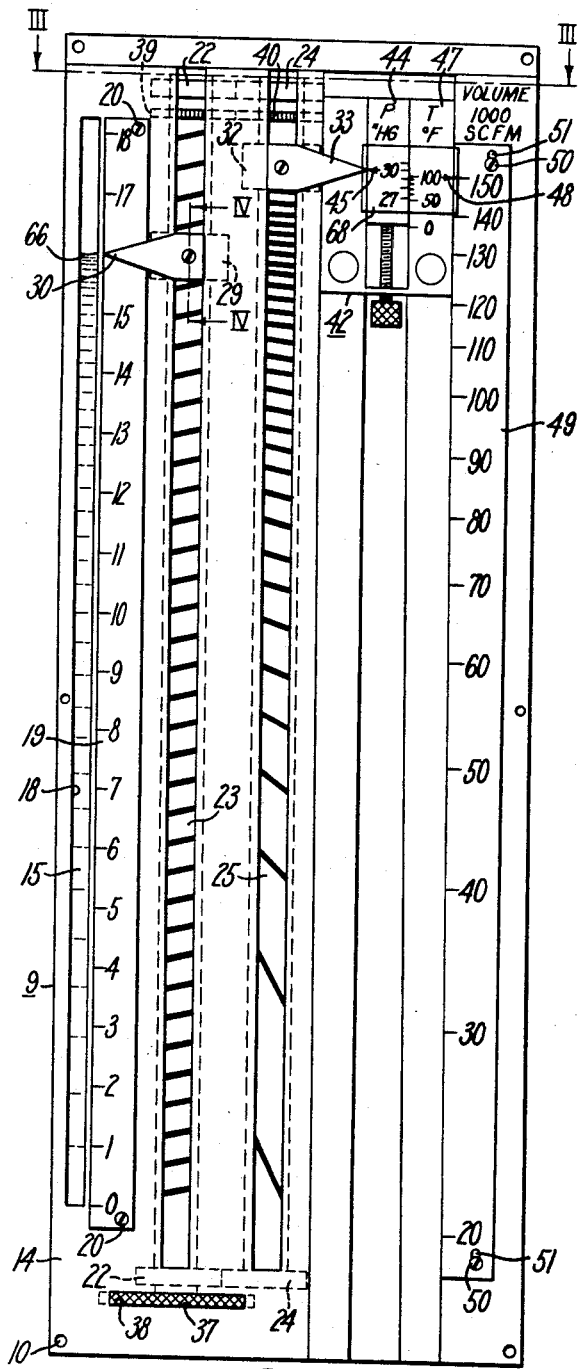
Fig. 1 is a front elevational view of the fluid flow measuring gauge.
Figure 2:
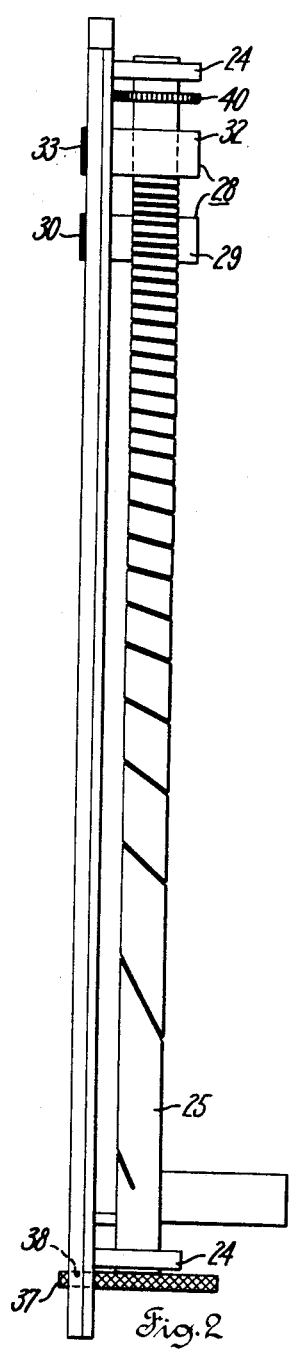

The flow measuring gauge solves the following flow equation based on equations published in Fluid Meters, fourth edition, A. S. M. E. research publication:

$$Q = K'\sqrt{\frac{h_w P_1}{T_1}}$$

when $$Q_1(\text{C. F. S. at } T_1 P_1) = 0.06068 K Y_1 D_2{}^2 \sqrt{\frac{h_w T_1}{P_1 G_y}}$$

where

G is the specific gravity of the gas
$h_w$ is in inches of water at 60° F.
K is the flow coefficient
$P_1$ is in lb. per sq. in. abs.
$D_2$ is diameter of the orifice
$T_1$ is the absolute temperature $(460 + T_1 F)$
y is the super compressibility factor
$Y_1$ is net expansion factor
$K'$ includes the flow coefficient, the standard condition being corrected to, and orifice diameter for Q(S. C. F. S.) according to ideal gas law:

$$\frac{P_1 V_1}{T_1} = \frac{P_s V_s}{T_s} \therefore V_s = \frac{P_1 T_s}{P_s T_1} V_1$$

if $V_1 = Q_1$, then (1) $\quad Q\text{ (S. C. F. S.)} = 0.06068 K Y_1 D_2{}^2 \frac{T_s}{P_s}\sqrt{\frac{h_w P_1}{T_1 G_y}}$ (2) $\quad Q\text{ (S. C. F. M.)} = K'\sqrt{\frac{h_w P_1}{T_1}}$ (3) $\quad \log Q(S. C. F. M.) = \log K' +$
$\quad\quad\quad \frac{1}{2}[(\log h_w + \log P_1) - \log T_1]$ Referring to the drawings, through the holes 10 provided in each corner and on the side of the flow measuring gauge 9, the gauge may be mounted on brackets attached to the compressor A, or can be mounted remotely as shown in Fig. 7 on the board of some control center. The intake conduit 11 of the compressor A is provided with a nozzle or plate type orifice 12, in which the velocity of the incoming fluid, such as air, is increased producing subatmospheric pressure which in turn results in the necessary pressure differential required for measuring the rate of flow.

The flow measuring gauge 9, consists essentially of the following: a retaining member such as the panel or plate 14 shown in Fig. 1. Mounted or affixed to the plate is an indicating means such as the transparent liquid filled manometer tube 15 shown in Fig. 1, affixed to the plate by the attachments 17 at the upper and lower end of the tube 15, which extends vertically and is exposed to the eye through a slot 18 in the plate.

Adjacent and parallel to the manometer tube is a linear scale 19 calibrated in inches and securely affixed to the plate by the screws 20, the range of measurement of the linear scale covering the exposed portion of the manometer tube. Parallel and adjacent the linear scale and rotatively affixed by the ball bearings 22 attached to the plate 14 is a linear lead screw 23 having in this application two threads per inch. Parallel and adjacent the linear lead screw and rotatively affixed by the ball bearings 24 to the plate 14 is a logarithmic lead screw 25, the logarithmic and linear threads of the screws defined by the spiraling square cut grooves 27, as shown in Fig. 4. Each of the lead screws has an index or follower 28 attached; the follower on the linear lead screw consisting of a sliding block 29 with a pointer 30, and the follower on the logarithmic lead screw consisting of a sliding block 32 with a pointer 33. The sliding blocks are designed so as to provide a spring 34 that is pressing a ball 35 detent in engagement wtih the square cut groove 27 defining the threads of the respective lead screws. A handwheel 37 is attached to the end of the linear lead screw 23, and a slot 38 is provided in the plate to allow for the accessibility of the handwheel. Suitable gears, 39 on the linear lead screw and 40 on the logarithmic lead screw, are arranged so that the gears intermesh, with the result that any movement of the linear lead screw 23 through turning of the handwheel 37 will result in the corresponding movement of the logarithmic lead screw 25.

The purpose of having a linear and logarithmic lead screw is to convert a linear reading into log functions; this is accomplished by relating the pitch of the linear screw 23 to that of the logarithmic screw 25 so that any distance traveled by the pointer 30 on the linear lead screw will be transposed through the intermeshing gears to give the logarithm of that distance to the pointer 33 on the logarithmic lead screw. As an example of the prior mentioned and selected two threads per inch on the linear lead screw 23 shown, on two revolutions of the linear lead screw the pointer 30 on the linear screw will have traveled one inch and the pointer 33 on the logarithmic lead screw will have traveled a distance equivalent to the log of one inch; on four revolutions of the linear lead screw the pointer 30 will have traveled two inches and the pointer 33 on the logarithmic lead screw will have traveled a distance equivalent to the log of two inches, continuing throughout the operable range. To establish the required thread relationship between the respective lead screws, the pitch of the threads on the linear lead screw may be selected arbitrarily for purposes of convenience, such as for fabrication, and by a combination of the gear ratio and the pitch of the threads on the logarithmic lead screw the movement of the two lead screws will be in the proper relationship required to solve the equation determining the rate of flow.

On movement of the linear lead screw 23 through turning of the handwheel 37, the intermeshing gears 39 and 40 on each of the respective lead screws will, through the motion translating means of the gears, permit the corresponding movement of the logarithmic lead screw 25.

Mounted within the plate parallel and adjacent to the logarithmic lead screw is a pair of sliding scales 42 that are movable throughout the entire operable range of the manometer tube. The slides are juxtapositioned and are so arranged within the plate through tongue and groove connections 43, as shown in Fig 3, that movement of the slides throughout the overall length of the gauge proper to the desired position is easily acomplished. The first slide is disposed adjacent to the logarithmic lead screw 25 and has a logarithmic pressure scale 44 thereon calibrated in barometric inches of mercury. An index 45 is placed on the pressure scale in a suitable position for alignment with the pointer 33 on the logarithmic lead screw. The second slide adjacent and juxtapositioned with the first slide, has a logarithmic temperature scale 47 calibrated in degrees of temperature, and also has an index 48 suitably located. A fourth scale known as the logarithmic standard flow scale 49 is located adjacent and parallel to the pair of sliding scales 42 and is affixed to the plate 14 by the screws 50 placed through the slots 51 provided on the scale. The scale 49 is calibrated in cubic feet per minute, but is actually the logarithmic function for the indicated values on the scale.

A method of suitably locating the indices 45 and 48 is to work out a sample problem where one of the index marks can be selected arbitrarily for convenience; say at index 48 which reads 100° F. on the temperature scale 47 as shown in Fig. 1. Knowing the rest of the values in the sample problem, the other index 45 on the pressure scale 44 may be set directly opposite and aligned with the pointer 33 on the logarithmic lead screw so that the problem as shown on all the scales is in the correct relationship, the index 45 on the pressure scale 44 of this related setting being permanently etched or affixed.

In logarithms to take square roots of a log you divide by two, and to accomplish this same function on a slide rule type device a scale twice the length of the multiplication scale may be used. Therefore, it is to be noted from the log values of the formula that the prior mentioned logarithmic lead screw 25, logarithmic pressure scale 44 and logarithmic temperature scale 47 are one-half the length of the logarithmic standard flow scale 49. To allow for deviations from theoretical constant K' to the actual field calibrated constant K' in the formula, $$Q = K' \sqrt{\frac{h_w P_1}{T_1}}$$

previously stated, the logarithmic standard flow scale 49 is shifted proportional to the required constant K'. This is accomplished through the slots 51 that are provided on the logarithmic flow scale 49 permitting vertical freedom of movement of the flow scale. The K' factor in the formula is taken care of in three locations; through the location of the indices 45 and 48 on the logarithmic pressure and temperature scales respectively, and through the prior mentioned slots 51 provided on the logarithmic standard flow scale 49. The desired rate of flow is read on the logarithmic standard flow scale 49 opposite the index 48 on the temperature scale 47. The physical length of the scales are dependent upon the pressure drop range, whereas the degree of accuracy required is dependent upon the ratio of the scales used.

The arrangement for making the square grooved logarithmic thread 27 in the logarithmic lead screw 25 will now be described. A standard lathe 53 is modified as shown in Figs. 5 and 6, by attaching a bevel gear 54 onto the end of the lathe's lead screw 55, the bevel gear ratio used dependent upon the desired pitch relationship required between the linear and the logarithmic lead screws and from the previous example of two threads per inch on the linear lead screw, a bevel gear ratio of 12 to 1 is shown. On a shaft 56 with the mating bevel gear 58 is attached a cam 59 made up by plotting the log function on a radial plot. The cam 59 is so constructed that it will require one revolution to complete one log screw. Any number of cams and corresponding ratios can be used for the specific application desired.

The cam 59 bears against a follower 60 on the tool carriage 61 which has been disengaged from the lathe's lead screw 55. The tool carriage 61 is moved by a system of pulleys and weights 63 and the rate of movement is governed by the cam 59. The thread 27 is cut by a small motor driven tool 64 attached to the tool carriage 61. For one logarithmic screw 25 the lathe headstock 65 will turn 36 revolutions, whereas the cam 59 will turn only one revolution. The square grooved thread 27 on the logarithmic screw, therefore, is cut in one pass. What has actually taken place is that the cam on the lathe is converting inches of travel to degrees of revolution, the logarithmic screw thread being as accurate as the plate cam made from the radial plot.

The flow equation, specifically Formula 3, is solved by means of logarithms through relative positioning of scales. Each variable of the equation is represented by a log scale on the gauge 9. The gauge 9 is based on the principle that when multiplying two numbers you may convert them to logs and add. The same idea is used in the operation of a slide rule. In this application the pressure is divided by the temperature (by matching up the temperature scale 47 and pressure scale 44 on the gauge) then the product is multiplied by the height of the water column 66 in the manometer tube 15. This is done by aligning a pointer 33 on the logarithmic lead screw, representing the log of the height of the water column 66, with an arrow 45 on the pressure scale 44.

One of the main advantages of the gauge 9 is that it is of a mechanical design in which no small intricate parts are employed which could be easily damaged. The gauge is rugged but limited to a given orifice 12, and a given flow range since the nozzle constant is included in the calibration of the logarithmic standard flow scale 49. It is to be understood that the gauge may be used to measure the rate of flow on the discharge side of a compressor as well, however the pressure in the conduit 13 on the discharge side must be given absolute values and be inserted in place of the barometric pressure on the proposed measuring gauge. This would necessitate a modification of the logarithmic values on the pressure scale 44 to include the operating pressure range. This would be the same for use in any other type of conduit with fluid flow where it is not under atmospheric conditions, the operating pressure range at the point of measurement of differential pressure measurement being expressed in absolute values. If the gauge is used to measure the flow of a gas, the gauge may be calibrated dependent upon the moisture content of the gas figured into the constant of the basic formula, resulting in the measurement of the rate of flow of either a wet or dry gas. However, the gauge 9 could be easily adapted to different flow conditions in a different orifice simply by changing the logarithmic standard flow scale 49. This is true since the basic principle of the flow gauge is the same regardless of actual flow conditions.

To operate the flow measuring gauge, assume that the system is operating so that the liquid column in the manometer tube 15 is at a given level 66; by turning the handwheel 37 the pointer 30 of the follower 28 on the linear lead screw 23 is aligned with the liquid level in the manometer tube. Referring to the sliding scales 42, the temperature on the logarithmic temperature scale 47 is set opposite the barometric pressure on the logarithmic pressure scale 44 under the existing atmospheric conditions that the flow gauge 9 is measuring. Though the temperature scale 47 as shown is in degrees Fahrenheit, it is actually in degrees Rankine or absolute in which the Rankine is equal to the Fahrenheit reading plus 460 degrees. The log function of the respective values of the absolute temperatures are indicated on the scale 47, but the corresponding degrees Fahrenheit are marked for convenience.

To facilitate and make easier and more accurate the readings on the respective scales 44 and 47, a plastic magnifying element is used, such as the cursor or hairline aid 68 shown in Figs. 1 and 3. After making the proper alignment of the existing temperature and pressure, the entire sliding scale 42 is moved so that the index 45 on the pressure scale 44 is aligned with pointer 33 on the logarithmic lead screw 25. It will be noted that upon any movement of the pointer 30 on the linear lead screw 23, through the intermeshing gears 39 and 40 the pointer 33 on the logarithmic lead screw 25 will move as the log of the pointer 30 on the linear lead screw 23. The rate of flow in cubic feet per minute is then indicated opposite the index 48 on the temperature scale 47; the means of combining the logarithms of the pressure differential, the logarithm of the pressure and the logarithm of temperature, with the constant K' figured in the prior mentioned locations within the scale structure, to give the log of the volumetric flow rate which in turn is read back directly as standard flow rate is the result of the structure herein disclosed.

While the form of embodiment of the invention as herein disclosed constitutes a preferred form, it is to be noted that other forms might be adopted, all coming within the scope of the claims which follow.

What is claimed is:

1. A fluid flow measuring gauge comprising a plate, pressure responsive indicating means subject to pressure conditions of a compressible fluid under flow and affixed to said plate, a linear lead screw coacting with a logarithmic lead screw through motion translating means, said screws rotatably affixed to said plate parallel to said indicating means, a first follower on one of said screws adapted to move upon rotation of said screws and cooperating with said indicating means, a second follower movable by said logarithmic screw, means for turning said screws to adjust said followers relative to said indicating means, a pair of sliding logarithmic scales affixed to said plate adjacent and parallel to said logarithmic lead screw, the first of said scales calibrated in barometric inches of mercury and having an index, the second of said scales calibrated in degrees of temperature and having an index, means for adjustably positioning the barometric scale index coordinated with the follower of said logarithmic lead screw, and a logarithmic flow scale affixed to said plate adjacent and parallel to said sliding scales, said flow scale calibrated in fluid volumes under standard conditions to be coordinated with said index of said second scale, the relative disposition of the scales being such that the volume rate of flow of fluid may be read directly for the indicated atmospheric conditions.

2. A flow measuring gauge, in which the rate of fluid flow is determined by the formula:

$$Q = K' \sqrt{\frac{h_w P_1}{T_1}}$$

of the variables represented, Q is flow in cubic feet per minute, K' includes the flow coefficient, the standard condition being corrected to, and orifice diameter, $h_w$ is height of water column (representing orifice pressure drop), $T_1$ is ambient temperature in °Rankine, $P_1$ is barometric pressure in p. s. i. a., comprising a retaining member, a transparent tube containing a column of liquid responsive to a pressure differential and affixed to said retaining member, a linear scale graduated in inches affixed to said retaining member and adjacent and parallel to said tube, a linear lead screw adjacent and parallel to said linear scale and rotatably affixed to said retaining member, a logarithmic lead screw adjacent and parallel to said linear lead screw and rotatably affixed to said retaining member, a first follower attached to one of said screws and having a sliding block with a pointer, a second follower movable by said logarithmic screw, a first and a second slide affixed to said retaining member and adjacent and parallel to said logarithmic lead screw, means providing for movement of the said slides throughout the entire operable range of said tube, said first slide having thereon a logarithmic pressure scale calibrated in barometric inches of mercury and having an index coordinated with the follower of said logarithmic lead screw, said second slide having thereon a logarithmic temperature scale calibrated in degrees of temperature and having an index and juxtapositioned with said logarithmic pressure scale, a logarithmic standard flow scale calibrated in cubic feet per minute affixed to said retaining member and adjacent and parallel to said second slide so that the index of said second slide is coordinated with said flow scale, motion translating means activating the follower on said logarithmic lead screw as the log of the follower on said linear lead screw, the relative disposition of the scales being such that the aligning of the follower on said linear lead screw with the height of the column of liquid in said transparent tube and the aligning of pressure and temperature conditions on said first and second slides and aligning of said index on said first slide with the follower on said logarithmic lead screw the index on said second slide will indicate the flow rate on said logarithmic flow scale.

3. A fluid flow measuring gauge comprising retaining means, pressure responsive indicating means subject to pressure conditions of a compressible fluid under flow and affixed to said retaining means, a linear lead screw coacting with a logarithmic lead screw through motion translating means, said screws rotatably affixed to said retaining means parallel to said indicating means, a first follower on one of said screws adapted to move upon rotation of said screws and cooperating with said indicating means, a second follower movable by said logarithmic screw, means for turning said screws to adjust said followers relative to said indicating means, a pair of juxtapositioned logarithmic sliding scales each having an index and affixed to said retaining means adjacent and parallel to said logarithmic lead screw, the first of said scales calibrated in units of pressure, the second of said scales calibrated in degrees of temperature, means for adjustably positioning said sliding scales with the index of said first scale coordinated with the follower of said logarithmic lead screw, and a logarithmic standard flow scale affixed to said retaining means and adjacent and parallel to said sliding scales, said flow scale calibrated in fluid volume rates of flow under standard conditions to be coordinated with the index on said second scale, the relative disposition of the scales being such that the volume rate of flow of compressible fluid may be read directly for operating temperatures and pressure conditions in standard flow units.

4. A flow measuring gauge, in which the rate of fluid flow is determined by the formula:

$$Q = K'\sqrt{\frac{h_w P_1}{T_1}}$$

of the variable represented, Q is flow in cubic feet per minute, K' includes the flow coefficient, the standard condition being corrected to, and orifice diameter, $h_w$ is height of water column (representing orifice pressure drop), $T_1$ is ambient temperature in °Rankine, $P_1$ is barometric pressure in p. s. i. a., comprising retaining means, a pressure responsive indicating means affixed to said retaining means and subject to pressure conditions of a compressible fluid under flow, a linear lead screw coacting with a logarithmic lead screw through motion translating means, said screws rotatably affixed to said retaining means parallel to said indicating means, a follower on each of said screws adapted to move upon rotation of said screws, means for moving the follower on said linear lead screw to thereby cooperate with said indicating means, a pair of juxtapositioned logarithmic sliding scales affixed to said retaining means and adjacent and parallel to said logarithmic lead screw, the first of said scales calibrated in barometric inches and having an index, the second of said scales calibrated in degrees of temperature and having an index, means for adjustably positioning said sliding scales so that the index on said pressure scale is coordinated with the follower on said logarithmic lead screw, and a logarithmic standard flow scale affixed to said retaining means and adjacent and parallel to said sliding scales, said flow scale calibrated in fluid volume rates of flow under standard conditions to be coordinated with the index on said temperature scale so that the volume rate of flow of compressible fluid may be read directly for operating temperature and pressure conditions in standard flow units.

5. A fluid flow measuring gauge comprising a plate, a liquid filled manometer tube responsive to a pressure differential of a compressible fluid and affixed to said plate, a linear scale graduated in inches affixed to said plate and adjacent and parallel to said manometer tube, a linear lead screw adjacent and parallel to said linear scale and rotatably affixed to said plate, a logarithmic lead screw adjacent and parallel to said linear lead screw and rotatably affixed to said plate, a first follower consisting of a sliding block with a pointer and attached to one of said screws, a second follower movable by said logarithmic screw, a pair of juxtapositioned slides affixed to said plate and adjacent and parallel to said logarithmic lead screw, the first of said slides having thereon a logarithmic pressure scale calibrated in barometric inches of mercury and having an index coordinated with the follower of said logarithmic lead screw, the second of said slides having thereon a logarithmic temperature scale calibrated in degrees of temperature and having an index, a logarithmic standard flow scale affixed to said plate and adjacent and parallel to said second slide and calibrated in volumetric flow units, the index of said second slide to be coordinated with said flow scale, motion translating means between said screws, means to actuate said linear lead screw to adjust the follower thereon relative to the height of the liquid in said manometer tube resulting in the corresponding movement of the follower on the logarithmic lead screw through said motion translating means as the log of the follower on said linear lead screw, the relative disposition of the scales being such that the aligning of pressure and temperature conditions on said first and second slides and aligning of said index on said first slide with the follower on said logarithmic lead screw the index on said second slide will directly indicate the flow rate on said logarithmic standard flow scale.

6. A flow measuring gauge, in which the rate of fluid flow is determined by the formula:

$$Q = K'\sqrt{\frac{h_w P_1}{T_1}}$$

of the variables represented, Q is flow in cubic feet per minute, K' includes the flow coefficient, the standard condition being corrected to, and orifice diameter, $h_w$ is height of water column (representing orifice pressure drop), $T_1$ is ambient temperature in °Rankine, $P_1$ is barometric pressure in p. s. i. a., comprising a plate, a liquid filled manometer tube responsive to a pressure differential of a compressible fluid and affixed to said plate, a linear scale graduated in inches affixed to said plate and adjacent and parallel to said manometer tube, a linear lead screw adjacent and parallel to said linear scale and rotatably affixed to said plate, a logarithmic lead screw adjacent and parallel to said linear lead screw and rotatably affixed to said plate, a follower consisting of a sliding block with a pointer and attached to one of said screws, a second follower movable by said logarithmic screw, a first and a second slide affixed to said plate and adjacent and parallel to said logarithmic lead screw, said first slide having thereon a logarithmic pressure scale calibrated in barometric inches of mercury and having an index coordinated with the follower of said logarithmic lead screw, said second slide having thereon a logarithmic temperature scale calibrated in degrees of temperature and having an index, a logarithmic standard flow scale affixed to said plate and adjacent and parallel to said second slide and calibrated in cubic feet per minute, said index of said second slide to be coordinated with said flow scale, a gear on each of said screws intermeshing with each other, a hand wheel on said linear lead screw to adjust the follower thereon relative to the height of liquid in said manometer tube resulting in having the follower on said logarithmic lead screw move through said intermeshing gears as the log of the follower on said linear lead screw, the relative disposition of the scales being such that the aligning of pressure and temperature conditions on said first and second slides and aligning of said index on said first slide with the follower on said logarithmic lead screw which is representing the log value of the height of the liquid in said tube the index on said second slide will directly indicate the flow rate on said logarithmic standard flow scale.

References Cited in the file of this patent

UNITED STATES PATENTS

| | | |
|---|---|---|
| 1,584,860 | Huff | May 28, 1926 |
| 1,889,876 | Pellerin | Dec. 6, 1932 |
| 2,614,425 | Falk | Oct. 21, 1952 |
| 2,759,668 | Hielle | Aug. 21, 1956 |

FOREIGN PATENTS

| | | |
|---|---|---|
| 304,713 | Germany | Apr. 2, 1918 |